(12) United States Patent
Watanuki et al.

(10) Patent No.: US 6,382,003 B1
(45) Date of Patent: May 7, 2002

(54) LOCK APPARATUS

(75) Inventors: Yoshio Watanuki; Tetsuyuki Tsukano; Satashi Ogata, all of Kanagawa-ken (JP)

(73) Assignees: Nissan Motor Co., Ltd.; Alpha Corporation, both of Yokohama (JP)

(*) Notice: Subject to any disclaimer, the term of this patent is extended or adjusted under 35 U.S.C. 154(b) by 0 days.

(21) Appl. No.: 09/590,259

(22) Filed: Jun. 9, 2000

(30) Foreign Application Priority Data

Jun. 11, 1999 (JP) .......................................... 11-165417

(51) Int. Cl.[7] ............................................. B60R 25/00
(52) U.S. Cl. ............................. 70/252; 70/184; 70/185; 70/186; 70/278.2; 70/278.3; 70/389; 70/408
(58) Field of Search ........................ 70/186, 252, 184, 70/185, 278.2, 278.3, 408, 389

(56) References Cited

U.S. PATENT DOCUMENTS

| | | | | |
|---|---|---|---|---|
| 3,708,032 A | * | 1/1973 | Suzuki .......................... 180/287 |
| 3,782,145 A | * | 1/1974 | Wolter ........................... 70/186 |
| 3,789,636 A | * | 2/1974 | Nakashima ..................... 70/252 |
| 4,427,967 A | * | 1/1984 | Maiocco ......................... 340/52 |
| 4,466,262 A | * | 8/1984 | Maiocco et al. ............... 70/252 |
| 4,716,748 A | * | 1/1988 | Watanuki et al. .............. 70/252 |
| 5,117,097 A | * | 5/1992 | Kimura et al. ................ 235/439 |
| 5,982,295 A | * | 11/1999 | Goto et al. ............. 340/825.54 |
| 6,003,349 A | * | 12/1999 | Nagae et al. .................. 70/186 |
| 6,095,415 A | * | 8/2000 | Shouji .......................... 235/449 |
| 6,223,571 B1 | * | 5/2001 | Rector ........................... 70/276 |

* cited by examiner

Primary Examiner—B. Dayoan
Assistant Examiner—Carlos Lugo
(74) Attorney, Agent, or Firm—McDermott, Will & Emery

(57) ABSTRACT

A lock apparatus of the invention capable of being locked/unlocked by an electronic key, comprises: an electronic key having a circuit chip generating an electronic signal, and an insertion portion provided at an end thereof and comprised of a pair of opposing flat portions and slope portions on both sides so as to be formed in a tapered flat shape; and a rotating member having an insertion hole opening at an end face thereof and in which the insertion portion of the electronic key is to be inserted, an opening portion of the key insertion hole having a rectangular sectional shape corresponding to a cross section of the insertion portion and being larger than an end of the insertion portion, and an interior of the key insertion hole being formed in a tapered flat shape corresponding to the tapered flat shape of the insertion portion and having a slant wall as a side face. Here, a rotating force from the electronic key inserted into the key insertion hole is transmitted to the rotating member through substantially full contact between the opposing flat portions of the electronic key and the interior the key insertion hole.

8 Claims, 10 Drawing Sheets

LOCK APPARATUS

BACKGROUND OF THE INVENTION

The present invention relates generally to a lock apparatus and more particularly a lock apparatus which can be applied to automotive steering preferably by using an electronic key preferably.

According to considerations of the inventor of the present invention and others, there are automotive steering lock apparatuses shown in FIGS. 9, 10.

In FIG. 9, reference numeral 40 denotes a rotator and reference numeral 41 denotes a rotator casing. Reference numeral 42 denotes a lock solenoid for engaging or disengaging a stopper 43 with or from an engaging groove 44 so as to lock or unlock a rotation of the rotator 40.

A slider hole 46 is provided in a lower portion of the rotator 40 such that it goes therethrough up to a key insertion hole 45. The slider 47 is disposed in the slider hole 46 such that it is freely slidable in a direction perpendicular to the key insertion hole 45.

A switch lever 49 is rotatably supported by a pin 50 in a bottom portion of a housing 48 and an end of the switch lever. 49 is urged upward by a spring 51, so that the slider 47 is pushed upward by this end. Consequently, a top end of the slider 4725 is protruded into the key insertion hole 45.

Further, a key presence/absence detecting switch 52 having an actuating element 53 opposing the other end of the switch lever 49 is disposed in the bottom portion of this housing 48.

If an insertion portion 55 of an electronic key 54 is inserted into the key insertion hole 45, the slider 47 is moved downward. Consequently, pressing of the actuating element 53 by the other end of the switch lever 49 is released, so that the key presence/absence detecting switch 52 is turned ON.

The electronic key 54 contains a circuit chip 56 which memorizes a predetermined identity code (ID).

An annular antenna coil 57 is provided around an end portion of the housing 48.

With such a structure, when the insertion portion 55 of the electronic key 54 is inserted into the key insertion hole 45 and then, the key presence/absence detecting switch 52 is turned ON, the control unit 60 shown in FIG. 10 carries out transmission and reception of an electronic signal by electric wave between the antenna coil 57 and circuit chip 56 so as to verify ID of the electronic key 54 with ID memorized in the control unit 60. Only when the IDs coincide with each other, a lock release signal is sent from the control unit 61 to the lock solenoid 42 so as to release the lock on the rotator 40. At the same time, a driving permission signal is sent to an engine driving control unit 60 so as to enable a startup of the engine.

In such a steering lock apparatus, only when the IDs coincide with each other, a rotation of the rotator 40 is enabled and an ignition switch 62 is turned ON (starter switch is actuated). Consequently, the driving permission signal is sent to the driving control unit 61 so as to enable the startup of the engine. Thus, when other key than the electronic key 54 is used, not only the rotation of the rotator but also the startup of the engine is blocked, thereby contributing to prevention of stealing of a vehicle.

SUMMARY OF THE INVENTION

However, with such a structure, the insertion portion 55 of the electronic key 54 has a straight structure having a rectangular cross section and the key insertion hole 45 in the rotator 40 is a straight hole slightly larger than the insertion portion 55.

Thus, when the electronic Key 54 is rotated with the insertion portion 55 being inserted into the key insertion hole 45, the insertion portion 55 makes into substantially full contact with the key insertion hole 45, so that a rotation force can be transmitted to the rotator 40 securely. However, when the insertion portion 55 is inserted, the tip thereof interferes with an opening edge of the key insertion hole 45, so that it may be difficult to insert the electronic key 54 into the hole.

Although as a countermeasure, it can be considered that an opening diameter of the key insertion hole 45 is formed larger than the cross section of the insertion portion 55, in this case, an oblique insertion of the electronic key 54 is allowed, so that an appropriate insertion condition of the electronic key 54 cannot be ensured.

Accordingly, an object of the present invention is to provide a lock apparatus capable of improving an insertion performance of the electronic key and encouraging an appropriate insertion of the electronic key.

To achieve the above object, the present invention provides a lock apparatus capable of being locked/unlocked by an electronic key, comprising: an electronic key having a circuit chip generating an electronic signal, and an insertion portion provided at an end thereof and comprised of a pair of opposing flat portions and slope portions on both sides so as to be formed in a tapered flat shape; and a rotating member having an insertion hole opening at an end face thereof and in which the insertion portion of the electronic key is to be inserted, an opening portion of the key insertion hole having a rectangular sectional shape corresponding to a cross section of the insertion portion and being larger than an end of the insertion portion, and an interior of the key insertion hole being formed in a tapered flat shape corresponding to the tapered flat shape of the insertion portion and having a slant wall as a side face. Here, a rotating force from the electronic key inserted into the key insertion hole is transmitted to the rotating member through substantially full contact between the opposing flat portions of the electronic key and the interior the key insertion hole.

DETAILED DESCRIPTION OF THE PREFERRED EMBODIMENT

Hereinafter, the preferred embodiment of the lock apparatus of the present invention will be described in detail with reference to the accompanying drawings.

First, the lock apparatus of an embodiment of the present invention will be described with reference to FIGS. 1 to 8.

Figure 1:
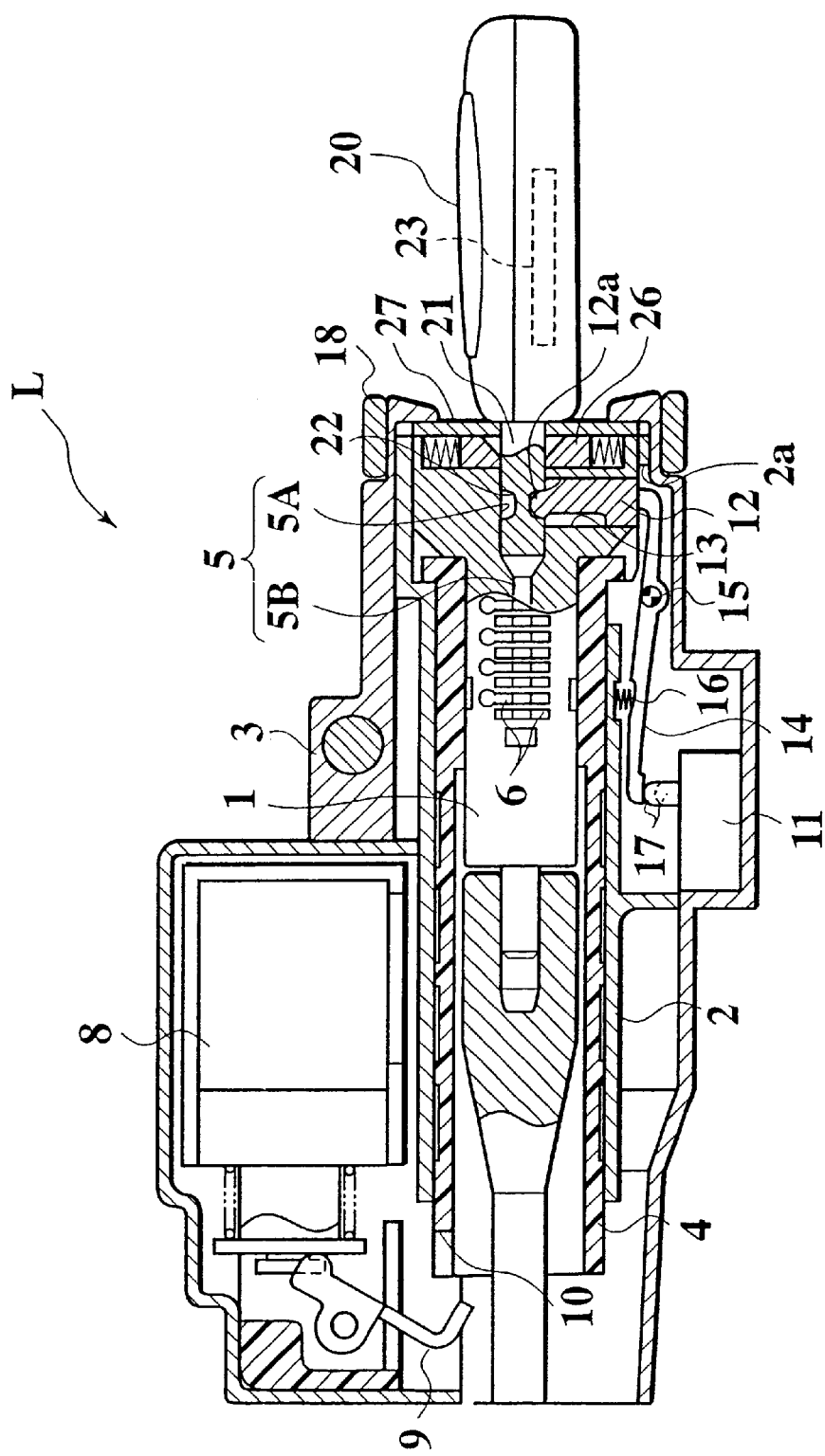
FIG. 1 is a sectional view showing a lock apparatus according to an embodiment of the present invention.

As shown In FIG. 1, in the lock apparatus L, reference numeral 1 denotes a key cylinder which is a rotating member for rotating an ignition switch, reference numeral 2 denotes a cylinder casing and reference numeral 3 denotes a housing on which the cylinder casing 2 is fixed.

The key cylinder 1 is inserted into an interior of a sleeve 4 freely rotatably, disposed in the cylinder casing 2 freely rotatably.

A key insertion hole 5 of the key cylinder 1 is comprised of an electronic key insertion hole 5A in which an insertion portion 21 of an electronic key 20 (see FIG. 7A) is to be inserted and a mechanical key insertion hole 5B which is formed continuously with a deep portion of the electronic key insertion hole 5A.

The key cylinder 1 has a plurality of tumblers 6 which emerge and retreat from/to a peripheral face of the mechanical key insertion hole 5B corresponding to insertion and removal of the mechanical key 25 (see FIG. 7B) into/from the mechanical key insertion hole 5B. A relation between the mechanical key 25 and tumbler 6 is the same as that of an ordinary key cylinder mechanism.

Figure 6A:
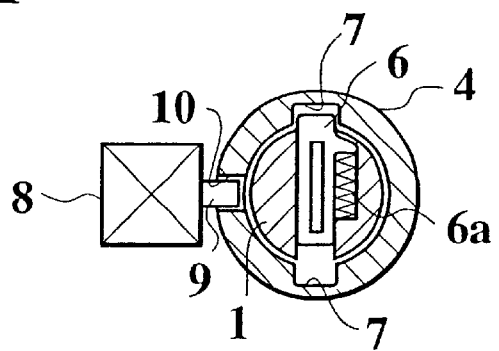
FIGS. 6A to 6C are operating condition diagrams showing a relation between the key cylinder and sleeve according to the embodiment.
Figure 6B:
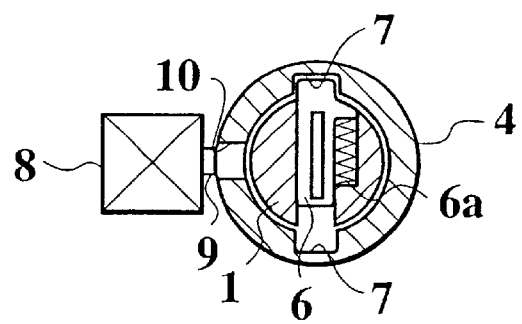
Figure 6C:
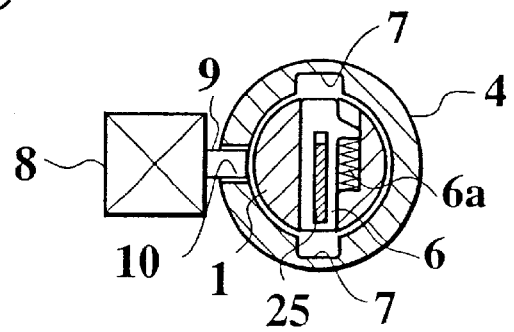
Figure 7A:
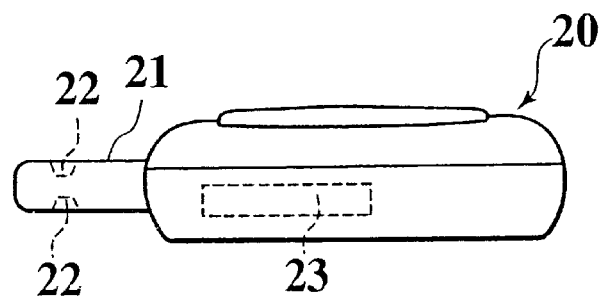
FIGS. 7A to 7C are explanatory diagrams showing the electronic key and mechanical key according to the embodiment.
Figure 7B:
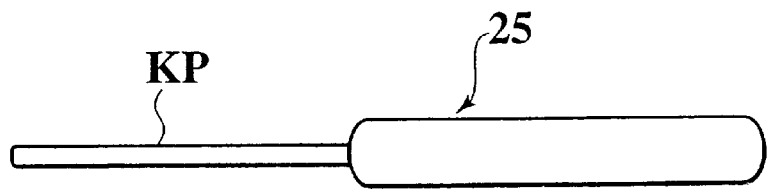
Figure 7C:
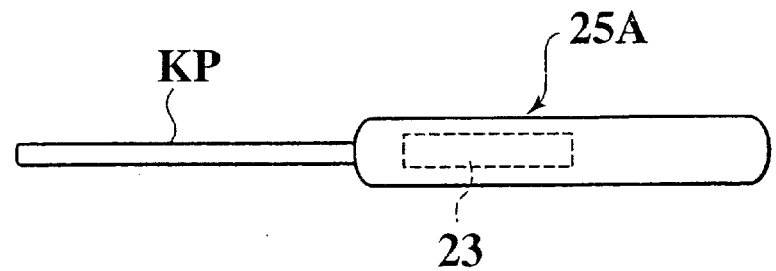

As shown in FIGS. 6A to 6C, tumbler engaging grooves 7 which the tumblers 6 engage and disengage from are formed in an inner peripheral face of the sleeve 4. Corresponding to engagement and disengagement between the tumbler 6 and tumbler engaging groove 7, connection and disconnection between the sleeve 4 and key cylinder 1 are carried out.

Reference numeral 8 denotes a solenoid which is a lock actuator disposed in a upper portion of the housing 3. The lock solenoid 8 engages or disengages a stopper 9 with/from a lock groove 10 provided in the sleeve 4 so as to lock/unlock a rotation of the sleeve 4.

Reference numeral 11 denotes a key presence/absence detecting switch which is a sensor for detecting presence or absence of a key, disposed in a lower portion of the housing 3. The key presence/absence detecting switch 11 detects whether or not a key is inserted into the key insertion hole 5A or 5B of the key cylinder 1. A first slider 12 connects with the key presence/absence detecting switch 11 as a key detecting member.

The cylinder casing 2 is disposed such that an inner peripheral face thereof opposes an outer peripheral face of the larger diameter portion of the key cylinder 1 across a minute gap.

A first slider hole 13 is provided in a lower portion of the large diameter portion of the key cylinder 1 such that it goes through a middle position in an axial direction of the electronic key insertion hole 5A. The first slider 12 is disposed in the first slider hole 13 such that a contact portion 12a which is a tip thereof is protruded into the electronic key insertion hole 5A and freely slidable in a direction perpendicular to the electronic key insertion hole 5A.

When the electronic key 20 is not inserted, a tip of the first slider 12 is protruded into the key insertion hole 5A and an outer end face thereof is submerged from an outer peripheral face of the key cylinder 1. If the insertion portion 21 of the electronic key 20 is inserted up to an appropriate position as described later, the first slider 12 is pushed by the insertion portion 21 so that the outer peripheral face thereof makes flush with an outer peripheral face of the key cylinder 1. A sliding motion of the tip of the first slider 12 into the key insertion hole 5A in the protruding direction is restricted by a difference of step between the first slider 12 and first slider hole 13.

A first check lever 14 for communicating with the first slider 12 and key presence/absence detecting switch 11 is disposed in the lower portion of the housing 3.

An intermediate portion of the first check lever 14 is ratatably supported by a pin 15 and a rotation force thereof in a single direction is urged by a spring 16. The first check lever 14 is disposed such that an end thereof is in contact with an actuating element 17 (switch lever) of the key presence/absence detecting switch 11 to serve as an operating portion. Further, the first check lever is disposed such that the other end thereof is in contact with an outer end face of the first slider 12 through a first opening portion 2a provided in the cylinder casing 2.

If the insertion portion 21 of the electronic key 20 is inserted into the key insertion hole 5A or the key plate KP of the mechanical key 25 is inserted into the mechanical key insertion hole 5B, the first slider 12 is pushed outward and then, the first check lever 14 transmits a sliding motion of the first slider 12 from the other end to that end, so that pressing of the actuating element 17 is released so as to turn ON the key presence/absence detecting switch 11. If the key cylinder 1 is rotated in a condition that the outer peripheral face of the first slider 12 makes flush with the outer peripheral face of the key cylinder 1, the other end of the first check lever 14 is moved from the outer peripheral face of the first slider 12 to an outer peripheral face of the key cylinder 1 and makes contact therewith in slidable.

Figure 5:
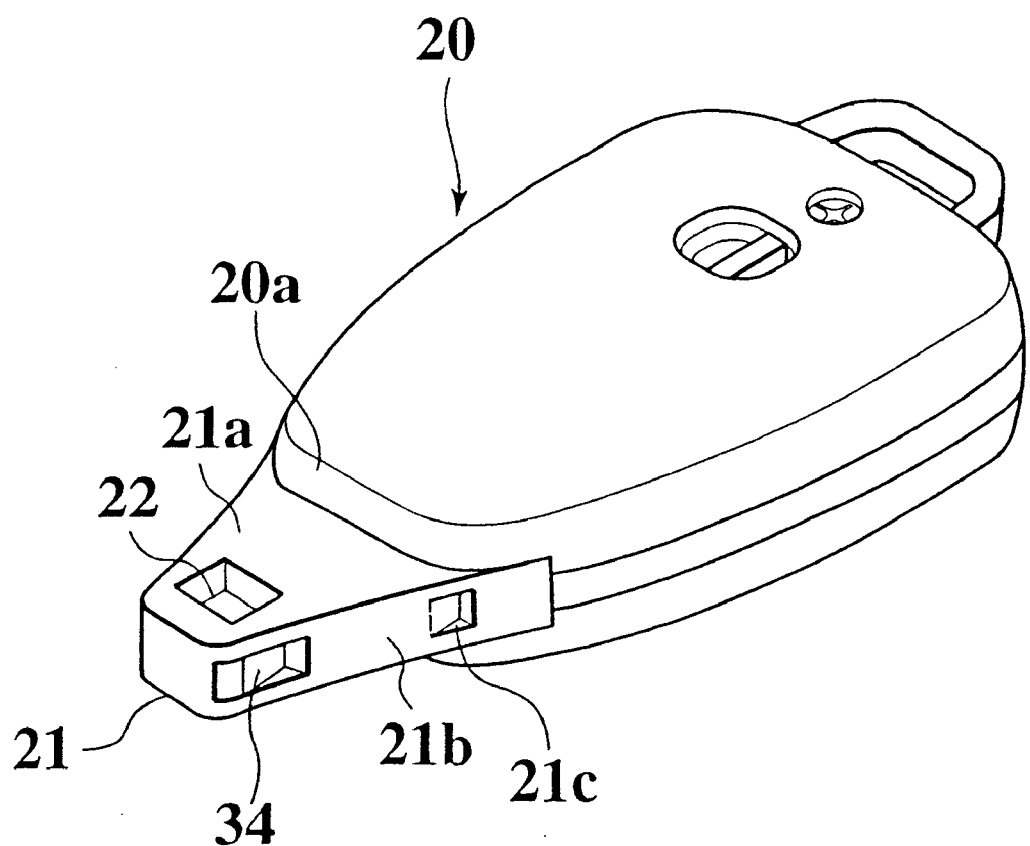
FIG. 5 is a perspective view of an electronic key according to the embodiment.

The insertion portion 21 of the electronic key 20 is shaped in a flat block comprising a pair of opposing flat portions 21a and slope portions 21b on both sides having a tapered tip as shown in FIG. 5. The insertion portion 21 is symmetrical with respect to a center line in the length direction and its section is rectangular.

On the other hand, the key insertion hole 5A of the key cylinder 1 has an opening whose section is rectangular as shown in FIGS. 2A, 2B and 4A, 4B so as to facilitate insertion of the electronic key 20 and further, it is formed larger than a tip of the insertion portion 21. An interior of the insertion portion 21 is formed in a flat shape narrowing as it goes to the front by providing with slant walls 5a on both side faces corresponding to the flat shape of the insertion portion 21. As a result, the key insertion hole 5A makes contact with the insertion portion 21 of the electronic key 20 through the entire faces, so that a rotation force of the electronic key 20 can be transmitted to the key cylinder 1 securely.

The key insertion hole 5A has a flat shape symmetrical with respect to a length axis thereof corresponding to the insertion portion 21. The first slider 12 of the key presence/absence detecting switch 11 goes through a bottom face of the key insertion hole 5A corresponding to an opposing flat portion 21a of the insertion portion 21 so that it is protruded from the bottom face of the key insertion hole 5A.

A concave portion 22 which the first slider 12 engages or disengages from is formed in the opposing flat portion 21a of the insertion portion 21 of the electronic key 20. When the insertion portion 21 is inserted into the key insertion hole 5A completely, the tip 12a of the first slider 12 engages the concave portion 22, so as to prevent the electronic key 20 from slipping out when the key cylinder 1 is rotated.

The thickness of the concave portion 22 is set substantially the same as the thickness of the key plate portion KP of the mechanical key 25. When the key is inserted properly with the tip 12a of the first slider 12 engaging the concave portion 22, the outer end face of the first slider 12 makes flush with the outer end face of the large diameter portion of the key cylinder 1.

The second slider hole 30 is provided so as to go through one slant wall 5a of the key insertion hole 5A and a second slider 31 is disposed in the second slider hole 30 such that it is freely slidable in a direction perpendicular to the key insertion hole 5A.

More specifically, the second slider 31 is disposed at a phase different by 90° in the rotation direction from the aforementioned first slider 12. A tip of the second slider 31 is protruded into the key insertion hole 5A so that it comes into contact with the slanted portion of the insertion portion 21 of the electronic key 20 or a side edge of the key plate portion KP of the mechanical key 25. Then, when the second slider slides, the second check lever (check lever) 32 is actuated so as to lock or unlock the steering shaft.

An intermediate portion of the second check lever 32 is rotatably supported by the cylinder casing 2 and held freely rotatably. Then, the second check lever 32 is urged so that an end thereof is brought into contact with an outside end face of the second slider 31 by a spring (not shown).

If the second slider 31 is slide outward up to a position in which the outer end face thereof makes flush with the external peripheral face of the large diameter portion of the key cylinder 1A and an end of the second check lever 32 is pushed by a predetermined stroke, the other end engages a lock member for locking a rotation of the steering shaft, so that the steering shaft is turned into a condition that it can be unlocked.

A protrusion 33 is provided at a position offset to the side of the opening of the key insertion hole 5A from the slider 31 on the slant wall 5a in which the second slider 31 is disposed so as to protrude, more specifically on an edge of the slider hole such that the protrusion keeps contact with the slider 31.

The protrusion 33 is protruded into the key insertion hole 5A with a protrusion amount smaller than the protrusion of the slider 31 and a contact surface 33a at a tip thereof comes into contact with the slope portion 21b of the insertion portion 21 of the electronic key 20.

The contact surface 31a of the second slider 31 and the contact surface 33a of the protrusion 33 are inclined faces basically having the same inclination angle in the same direction as the slant wall 5a of the side in which the slider 31 and protrusion 33 are disposed.

Figure 3A:
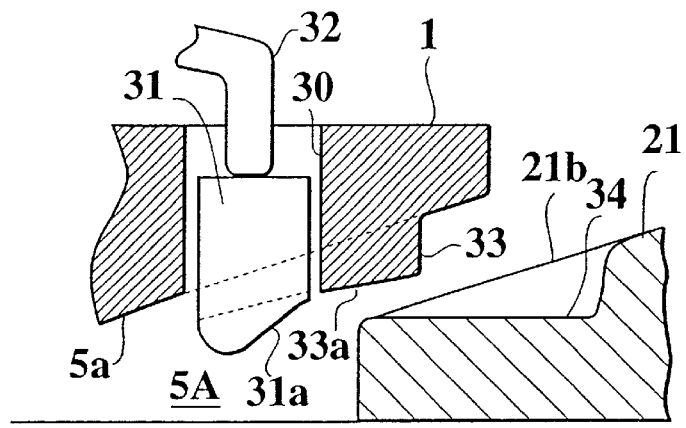
FIG. 3A is a schematic sectional view showing a same second slider disposing portion with a second check lever disposing portion expressed upward for convenience according to the embodiment.
Figure 3B:
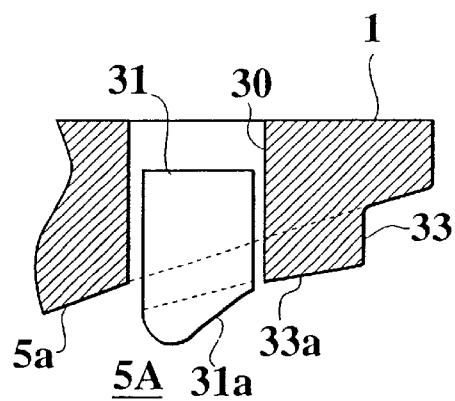
FIG. 3B is a schematic sectional view showing other example of the second slider disposition portion according to the embodiment.

More specifically, the contact surface 31a of the second slider 31 and the contact surface 33a of the protrusion 33 are so constructed that as shown in FIG. 3A, an inclination of the contact surface 31a is continuous to the inclination of the contact surface 33a at a joint portion therebetween when the slider 31 is protruded (when the electronic key is not inserted) or as shown in FIG. 3B, an edge of the contact surface 31a is hidden behind the protrusion 33.

That is, in any way, the contact surface 31a of the second slider 31 and the contact surface 33a of the protrusion 33 are so constructed that the edge of the contact surface 31a of the slider 31 is not protruded like a step from the contact surface 33a of the protrusion 33.

On the other hand, a guide groove 34 for receiving and guiding the protrusion 33 is provided in the slope portion 21b of the insertion portion 21 of the electronic key 20.

In FIG. 1, reference numeral 26 denotes a shutter and reference numeral 27 denotes a cylinder cap.

A pair of leg portions 27a protruded backward are formed on the cylinder cap 27. The leg portions 27a engage a pair of cutout concave portions 5b provided in an outer peripheral face of the large diameter portion of the key cylinder 1. An outer periphery front of the cylinder cap 27 is covered by the casing 3, so that the cylinder cap 27 rotates integrally with the key cylinder IA and is prevented from dropping forward.

An opening 27b communicating with the key insertion hole 5A is provided in the cylinder cap 27 and a pair of protrusions 27c are protruded into the opening 27b.

Correspondingly, a pair of contact portions 21c are provided in the slope portion 21b of the insertion portion 21 of the electronic key 20. When the electronic key 20 is inserted completely, the protrusions 27c make contact with the contact portions 21c.

A grip side face 20a of the electronic key 20 makes contact with a concave portion 27d on each of both sides of the opening 27b.

The electronic key 20 incorporates a circuit chip 23 which memorizes a predetermined identity code (ID).

An end portion of the housing 3 has an annular antenna coil 18 as a detector for an electronic signal dispatched from the electronic key 20, the antenna coil being provided around that portion.

Figure 8:
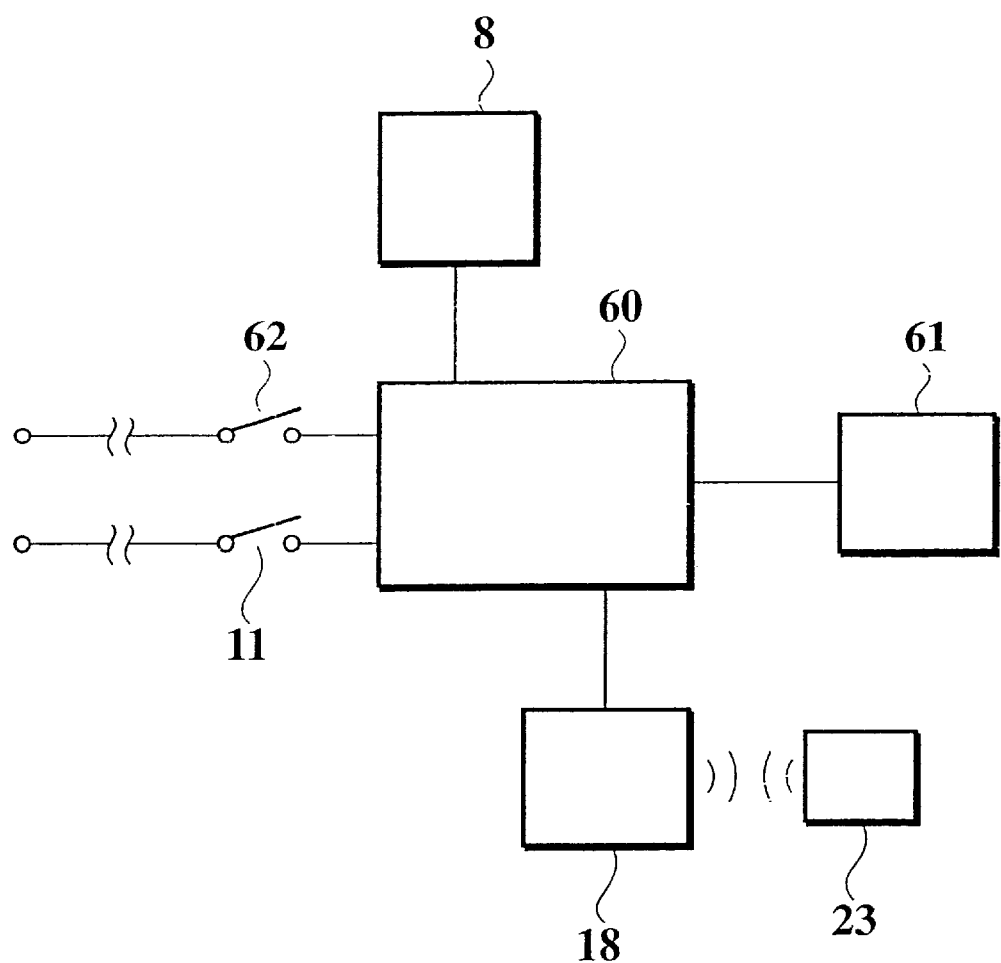
FIG. 8 is a block diagram of an electric circuit according to the embodiment.
Figure 9:
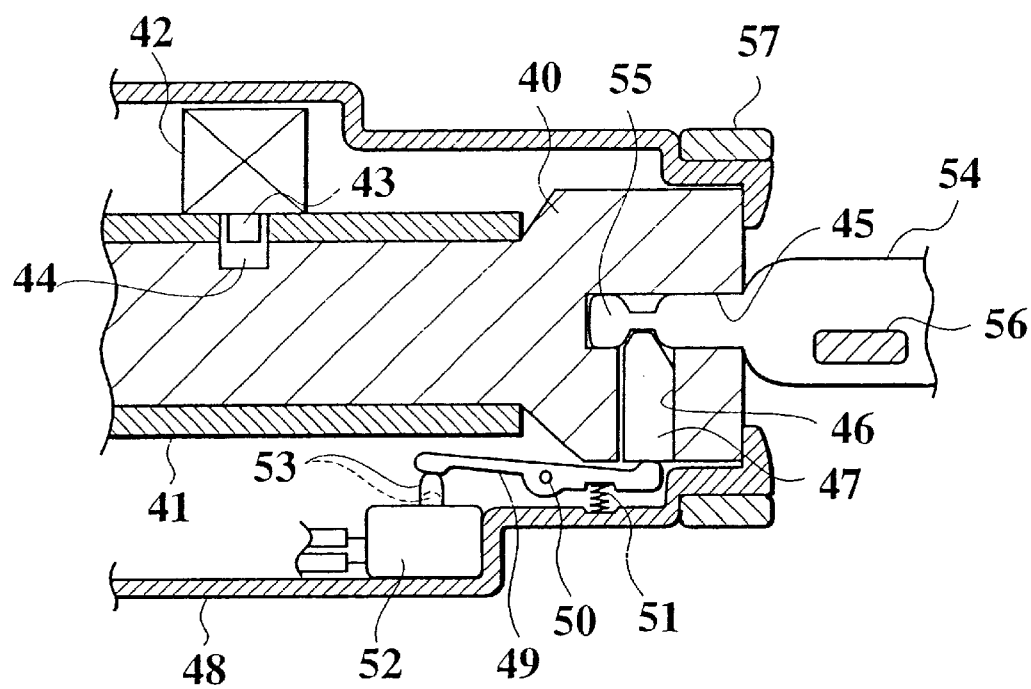
FIG. 9 is a sectional view showing a lock apparatus according to considerations of the inventors of the present invention.
Figure 10:
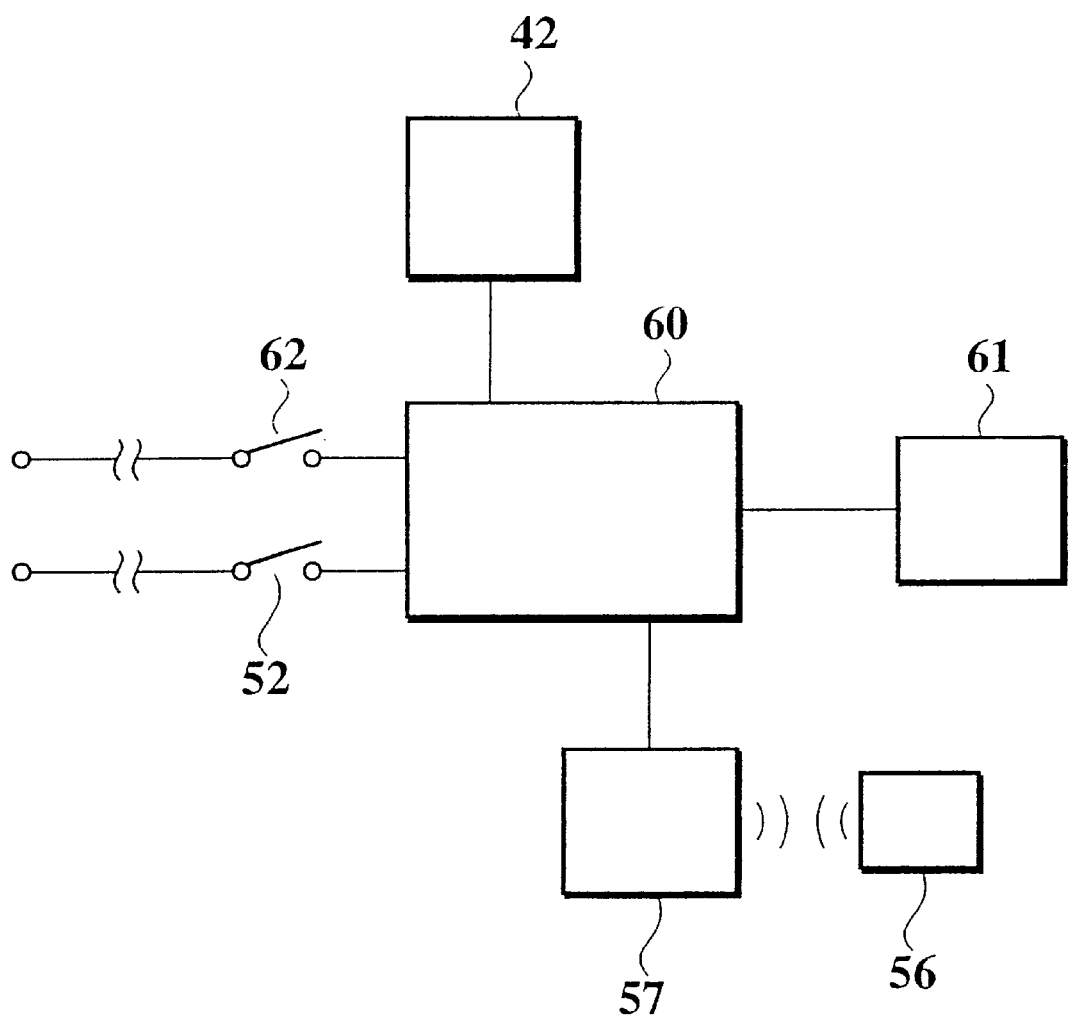
FIG. 10 is a block diagram of the electric circuit according to the considerations.

In electric circuit structure according to this embodiment, as shown in FIG. 8, a key cylinder lock solenoid 8, a key presence/absence detecting switch 11, an antenna coil 18, a driving control unit 61, and an ignition switch 62 are connected to a control unit 60. Transmission and reception of a predetermined electric signal are carried out between the antenna coil 18 and the circuit chip 23 of the electronic key 20.

An operation of this embodiment will be described in detail.

First, in normal condition, a startup operation of an engine is carried out by the electronic key 20.

If the Insertion portion 21 of the electronic key 20 is inserted into the key insertion hole 5A of the key cylinder 1, the first slider 12 is pushed so as to turn ON the key presence/absence detecting switch 11. Then, the control unit 60 generates an electric field in the antenna coil 18 so as to carry out the transmission and reception of the electronic signal between the circuit chip 23 of the electronic key 20 and the antenna coil 18.

Next, correspondingly, the control unit 60 carries out the transmission and reception of the electronic signal between the circuit chip 23 of the electronic key 20 and antenna coil 18 so as to verify ID memorized in the circuit chip 23 with ID memorized in the control unit 60.

Then, when both the IDs coincide with each other, the control unit 60 generates an engine driving permission signal and at the same time, the control unit 60 sends a lock release signal to the key cylinder lock solenoid 8. The stopper 9 is moved from a condition shown in FIG. 6A to a condition shown in FIG. 6B, namely, in which it is released from the lock groove 10, so that the sleeve 4 is unlocked.

Figure 2A:
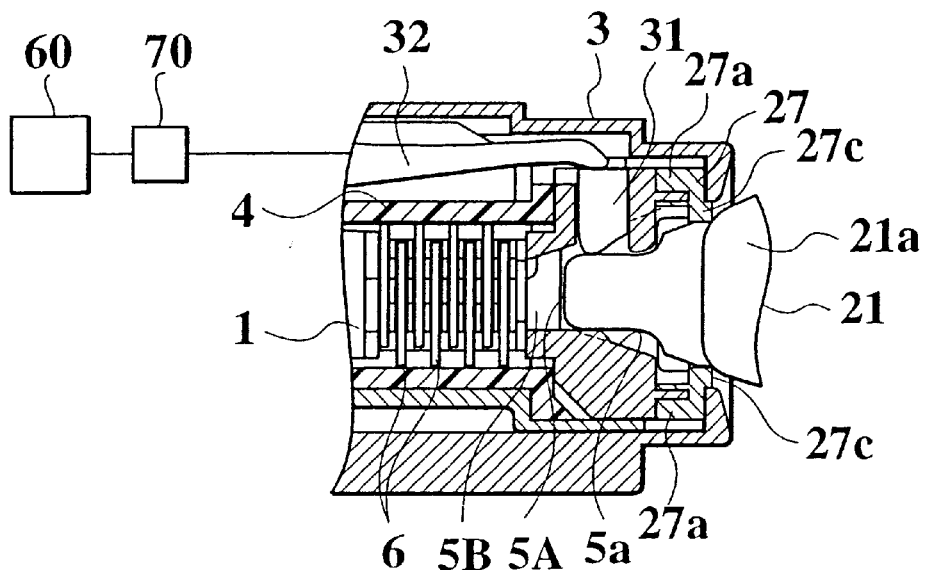
FIG. 2A is a sectional view of a key insertion hole forming portion as viewed in plan when an electronic key is inserted normally according to the embodiment.
Figure 3C:
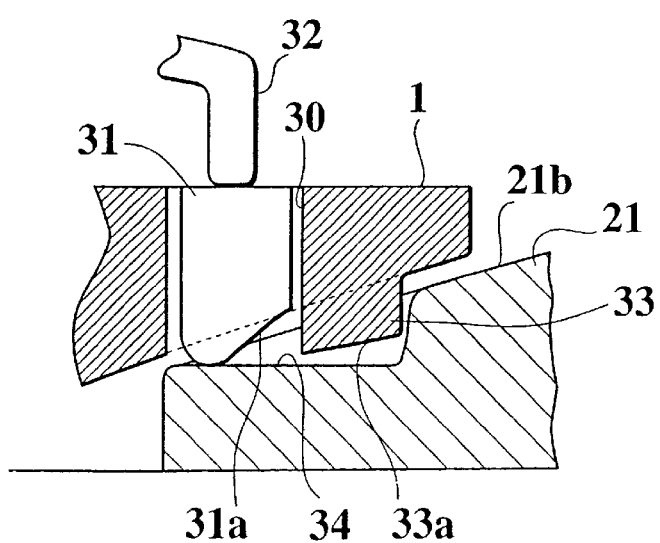
FIG. 3C is a schematic sectional view showing a slider operating condition when an electronic key is inserted according to the embodiment.
Figure 4A:
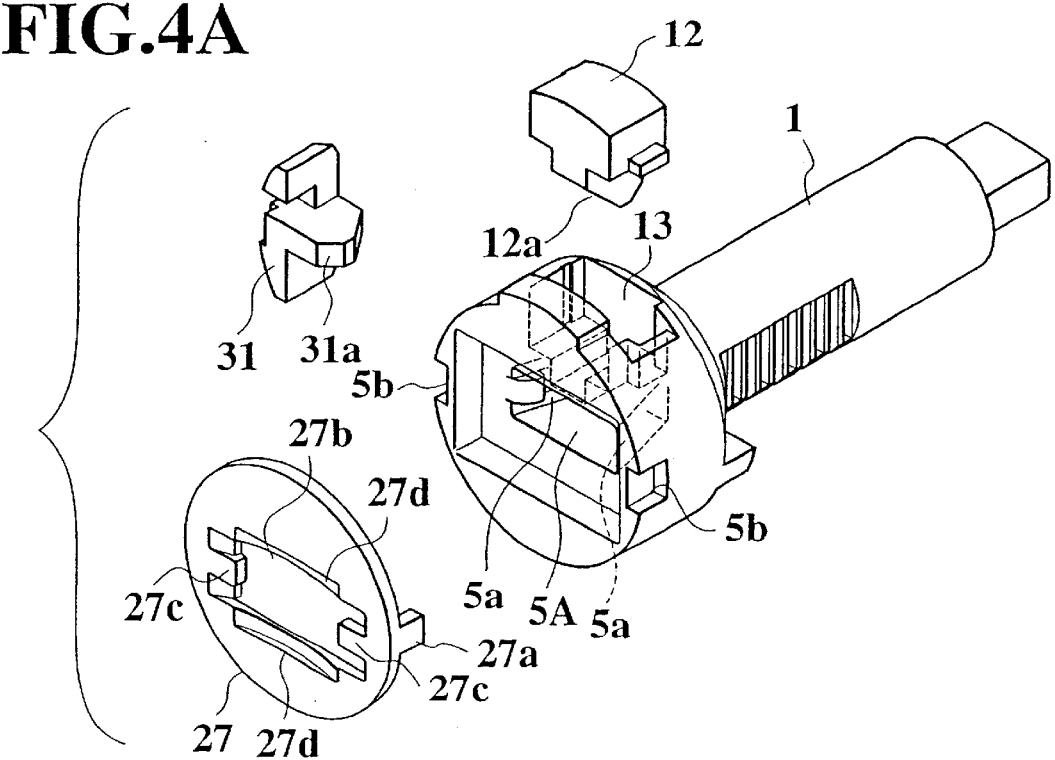
FIGS. 4A, 4B are disassembly perspective views showing a relation between a key cylinder and first/second sliders, indicating views obtained from different directions according to the embodiment.
Figure 4B:
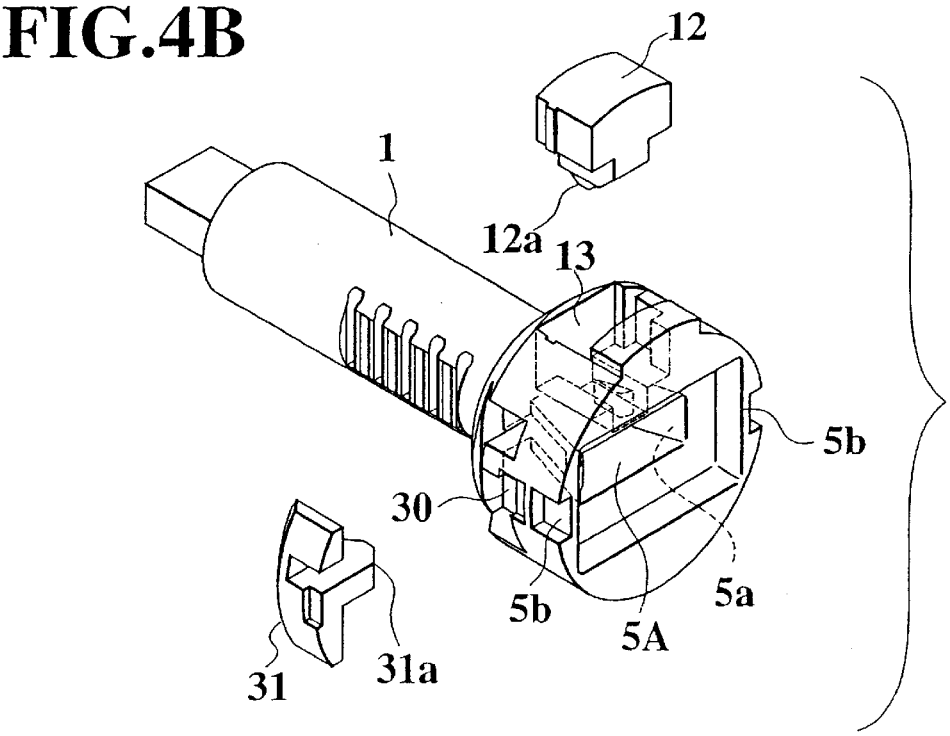

On the other hand, when the electronic key 20 is inserted into the key insertion hole 5A, as shown in FIGS. 2A, 3C, the second slider 31 is slid to push up an end of the second check lever 32, so that the lock member of a steering shaft (not shown) is turned into a condition in which it is capable of being unlocked.

When the electronic key 20 is inserted into the key insertion hole 5A like this, as shown in FIG. 6B, an end of the tumbler 6 of the key cylinder 1 engages the tumbler engaging groove 7 of the sleeve 4 by a spring force of the tumbler spring 6a.

Thus, when the electronic key 20 is turned with this condition, the key cylinder 1 is rotated integrally with the sleeve 4, the lock on the steering shaft by the lock member is released and at the same time, the ignition switch 62 is turned ON by the rotation of the key cylinder 1 (starter switch is actuated). Consequently, the control unit 60 sends a driving permission signal to the engine driving control unit 61 so as to start the engine.

If a supply of electric power to the control unit 60 is disabled because the battery goes dead or other reason, unlocking operation of the lock solenoid 8 by the electronic key 20 is disabled.

That is, the steering shaft remains locked so that the steering operation is disabled. In such a case, when, as shown in FIG. 6C, the key plate KP of the mechanical key 25 or the IMMOBI key (immobilization key) 25A (see FIG. 7C) incorporating the circuit chip 23 in its key head is inserted into the mechanical key insertion hole 5B of the key cylinder 1, the tumbler 6 is submerged into the key cylinder 1 so as to release an engagement with the sleeve 4, so that the rotation of the key cylinder 1 is made free. At the same time, the second slider 31 is slide by the mechanical keys 25, 25A so as to push an end of the second check lever 32. Consequently, the lock member is turned into a condition in which it is capable of being unlocked by the other end.

Thus, by rotating the key cylinder 1 by means of the mechanical key 25 or 25A, the lock on the steering shaft (not shown) can be released so that the steering operation is enabled.

When the engine is started by means of the electronic key 20, the insertion portion 21 can be inserted into the key insertion hole 5A easily because the opening portion of the key insertion hole 5A is formed larger than the tip portion of the insertion portion 21.

Figure 2B:
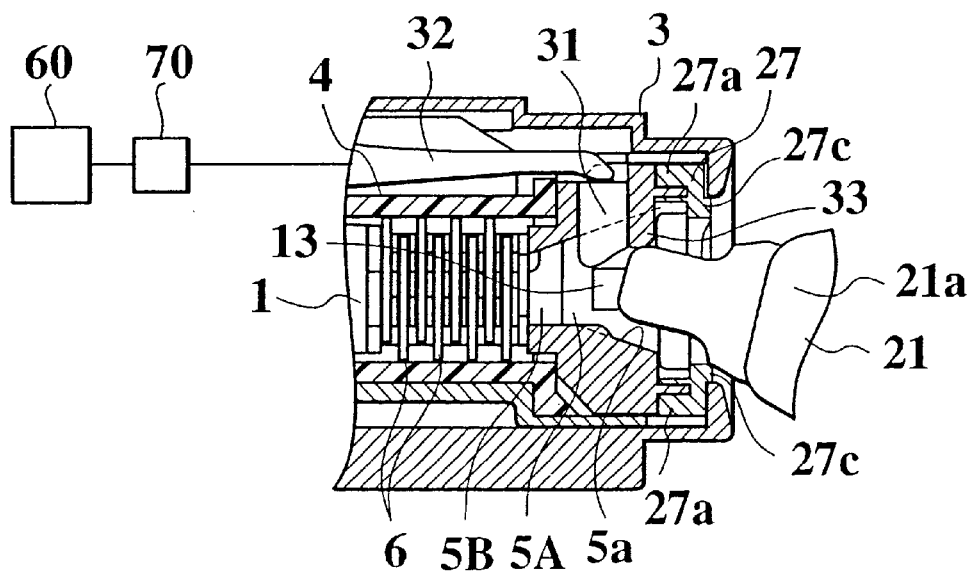
FIG. 2B is a sectional view of the key insertion hole forming portion as viewed in plan when the electronic key is not inserted normally according to the embodiment.

Then, the insertion portion 21 is formed in a tapered flat shape and corresponding thereto, the key insertion hole 5A is also formed in a tapered flat shape. Even when the insertion portion 21 is inserted obliquely as shown in FIG. 2B, the insertion portion 21 can be introduced to an appropriate condition as shown in FIG. 2A by a guide action between the slope portion 21b of the insertion portion 21 and the slant wall 5a of the key insertion hole 5A.

Therefore, the insertion performance of the electronic key 20 can be improved and it is possible to avoid a key operation with such an incomplete insertion in which the key is inserted obliquely.

Additionally, the opposing flat portions 21a of the insertion portion 21 of the electronic key 20 can be brought into substantially full contact with the key insertion hole 5A, so that the key cylinder 1 can be rotated with a light operating force securely.

Further, although the second slider 31 is disposed so as to be protruded from the slant wall 5a of the key insertion hole 5A, the insertion portion 21 is guided to the center of the key insertion hole 5A appropriately by the protrusion 33, even when the electronic key 20 is inserted, obliquely, because the protrusion 33 exits forward of the second slider 31 (near the opening of the key insertion hole 5A). Thus, in such a case, the operation of the slider 21 can be carried out further securely.

Further, because the protrusion 33 is accommodated in the guide groove 34 provided in the slope portion 21b of the insertion portion 21 of the electronic key 20, substantially no gap is generated between the slope portion 21b and the slant wall 5a. Thus, the slope portion 21b and the slant wall 5a can be brought into a sliding contact with each other so as to avoid an unnecessary looseness.

Further, the contact surface 31a of the second slider 31 and the contact surface 33a of the protrusion 33 are formed as an inclined surface in the same direction as an inclination of the slant wall 5a in which they are disposed. Additionally, they are so constructed that the edge of the contact surface 31a of the slider 31 is not protruded like a step from the contact surface 33a of the protrusion 33 at a joint portion between the contact surfaces 31a and 33a. Thus, such an event that the tip portion of the insertion portion 21 is caught by the protrusion 33 and slider 31 when the electronic key 20 is inserted can be suppressed, so that the electronic key 20 can be inserted smoothly into the key insertion hole 5A.

Further, because the protrusion 33 is provided so as to be protruded such that it is in contact with the slider 31 along a hole edge of the slider hole 30, such an event that the tip of the insertion portion 21 comes into contact with the slider 31 when the electronic key 20 is inserted obliquely can be avoided securely, so that the operation of the slider 31 can be ensured further.

Here, a protrusion amount of the protrusion into the key insertion hole 5A is desired to be such that when the electronic key 21 is inserted obliquely with one of the slope portion 21b of the insertion portion 21 of the electronic key 20 being in contact with the slant wall 5a on an opposite side to a side in which the slider 31 is disposed of the key insertion hole 5A and a tip of the other slope portion 21b of the insertion portion 21 being in contact with the protrusion 33, the tip of the insertion portion 21 is not in contact with the slider 31 or a sliding amount of the slider 31 does not reach an allowance of a lock member (not shown) which is a movable member even when the slider 31 is slid with the tip of the insertion portion 21 being in contact with the slider 31. As a result, the operation of the slider 31 when the electronic key 20 is inserted obliquely can be improved further.

According to this embodiment, as described above, the opening portion of the electronic key insertion hole 5A is formed larger than the tip portion of the insertion portion 21 of the electronic key 20 and the insertion portion 21 can be inserted into the key insertion hole 5A easily and further, even when the insertion portion 21 is inserted obliquely, the insertion portion 21 can be introduced to an appropriate condition by a guide action between the slope portion 21b and slant wall 5a of the key insertion hole 5A. Thus, the insertion performance of the electronic key 20 can be improved and an incomplete insertion of the electronic key 20 can be avoided.

Further, because the opposing flat portions 21a of the insertion portion 21 make substantially full contact with the key insertion hole 5A, the rotating member (key cylinder 1) can be rotated securely with a light operating force.

Further, even when the electronic key 20 is inserted obliquely, the insertion portion 21 can be guided to the center of the key insertion hole 5A by the protrusion 33, so that the operation of the second slider 31 can be ensured further.

Further, because protrusion 33 is accommodated in the guide groove 34 provided in the slope portion 21b of the insertion portion 21, the slope portion 21b can be brought into a sliding contact with the slant wall 5a of the key insertion portion 5A so as to avoid a generation of looseness.

Further, the contact surface 31a of the second slider 31 and the contact surface 33a of the protrusion 33 are set up appropriately corresponding to an inclination of the slant wall 5a of the key insertion hole 5A and the joint portion therebetween is set not to be protruded like a step. Thus, when the electronic key is inserted, it can be inserted smoothly into the electronic key insertion hole 5A without the tip portion of the insertion portion 21 being caught by the protrusion 33 and the second slider 31.

Further, because the protrusion 33 is disposed on the side of the second slider 31, an event that the tip of the insertion portion 21 comes into contact with the slider 31 when the electronic key 20 is inserted obliquely can be avoided, so that the operation of the second slider 31 can be ensured further.

Further, because the protruding amount of the protrusion 33 is set appropriately, the operation of the second slider 31 when the electronic key 20 is inserted obliquely can be ensured further.

Further, because the second slider 31 is employed as a trigger member for the second check lever 32, locking and unlocking of the steering shaft can be carried out smoothly.

According to this embodiment, the second slider 31 is employed as a trigger member for the second check lever 32 for controlling the locking member for steering lock so that the locking and unlocking of the steering shaft are carried out smoothly. Alternatively, it is permissible to use the second slider 31 as a trigger member for a switch of transmission/reception system of the control unit 60, for example, the switch 70 (see FIGS. 2A, 2B) for determining whether or not the electronic key 20 is inserted appropriately and make the first slider cooperate with the key presence/absence detecting switch 11 which is a trigger member for ON/OFF operation so as to ensure smooth locking and unlocking of the key cylinder 1.

Although according to this embodiment, a case in which the key cylinder is used as the rotating member capable of unlocking the steering lock by means of the mechanical key 25 instead of the electronic key 20 has been indicated, of course, it is permissible to employ a rotator which can be rotated by only the electronic key 20.

For this embodiment, the automotive steering lock apparatus has been picked up as an application example. However, the present invention is not restricted to this, but the present invention can be applied to common doors of apartment house (automatic door: locked/unlocked with an electronic key), a lock apparatus of door of each residence (locked/unlocked with the electronic key or mechanical key), lock apparatus of a large cash box and the like. Further, the present invention may be applied to a lock apparatus employing the mechanical key as a master key for emergency and the electronic key as general key.

The entire contents of a Patent Application No. TOKUGANHEI 11-165417 with a filing date of Jun. 11, 1999 in Japan are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A lock apparatus capable of being locked/unlocked by an electronic key, comprising:

an electronic key having a circuit chip generating an electronic signal and an insertion portion provided at an end thereof and comprised of a pair of opposing flat portions and slope portions on both side so as to be formed in a tapered flat shape;

a rotating member having an insertion hole opening at an end face thereof and in which the insertion portion of the electronic key is to be inserted, an opening portion of the key insertion hole having a rectangular sectional shape corresponding to a cross section of the insertion portion and being larger than an end of the insertion portion and an interior of the key insertion hole being formed in a tapered flat shape corresponding to the tapered flat shape of the insertion portion and having a slant wall as a side face wherein a rotating force from the electronic key inserted into the key insertion hole is transmitted to the rotating member through substantially full contact between the opposing flat portions of the electronic key and the interior the key insertion hole wherein the rotating member includes a slider such that a contact surface of an inner end thereof goes through the slant wall of the key insertion hole into the key insertion hole and the contact surface is capable of coming into contact with one of the slope portions of the insertion portion of the electronic key and sliding thereon so as to control an operation of a movable member, and wherein the rotating member has a protrusion such that a contact surface of an end thereof is capable of coming into contact with one of the slope portions of the insertion portion of the electronic key together with a protruding amount smaller than that of the slider, the protrusion being disposed at a position deviated to the opening portion of the key insertion hole with respect to the slider extending from the slant wall.

2. A lock apparatus according to claim 1, wherein a guide portion receiving and guiding the protrusion is provided to each of the slope portions of the insertion portion of the electronic key.

3. A lock apparatus according to claim 1, wherein each of the contact surface of the slider and that of the protrusion has an inclined face having the same inclination direction as an inclined face of the slant wall of the key insertion hole.

4. A lock apparatus according to claim 1, wherein an edge of the contact surface of the slider at the side of the protrusion is not protruded from the contact surface of the protrusion between the contact surface of the slider and that of the protrusion.

5. A lock apparatus according to claim 1, wherein the protrusion is provided so as to be in contact with a side face of the slider.

6. A lock apparatus according to claim 1, wherein a protrusion amount of the protrusion is such that when the electronic key is inserted obliquely with one of the slope portions of the insertion portion of the electric key being slidably in contact with the slant wall on the side opposite to that where the slider is disposed to the key insertion hole and an end of the other of the slope portions being in contact with the protrusion, the end of the insertion portion is not in contact with the slider or a sliding amount of the slider does not reach a moving allowance amount of the movable member even when the slider is slid by the end of the insertion portion in contact with the slider.

7. A lock apparatus according to claim 1, wherein a control unit is provided to verify an ID of the electronic key and that of the circuit chip by carrying out transmission and reception of the electronic signal between the control unit and the circuit chip, and when the electronic key is inserted into a normal position, the slider turns ON/OFF a switch of a system for the transmission and reception of the control unit and locking on the rotating member is released.

8. A lock apparatus according to claim 1, wherein the slider actuates a lever member locking a rotation of a shaft member to allow a rotation of the shaft member when the electronic key is inserted into a normal position.

* * * * *